(12) United States Patent
Niwa (10) Patent No.: US 10,069,444 B2
(45) Date of Patent: Sep. 4, 2018

(54) MOTOR CONTROL APPARATUS HAVING FUNCTION OF DISCHARGING ENERGY REMAINING IN DC LINK

(71) Applicant: FANUC Corporation, Yamanashi (JP)

(72) Inventor: Masakazu Niwa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/872,599

(22) Filed: Oct. 1, 2015

(65) Prior Publication Data

US 2016/0099664 A1 Apr. 7, 2016

(30) Foreign Application Priority Data

Oct. 2, 2014 (JP) ................. 2014-204204

(51) Int. Cl.
| | |
|---|---|
| *H02M 1/12* | (2006.01) |
| *H02M 1/42* | (2007.01) |
| *H02P 6/00* | (2016.01) |
| *H02M 5/458* | (2006.01) |
| *H02P 27/08* | (2006.01) |
| *H02P 4/00* | (2006.01) |

(Continued)

(52) U.S. Cl.
CPC ............ *H02P 6/002* (2013.01); *H02M 5/458* (2013.01); *H02P 4/00* (2013.01); *H02P 23/26* (2016.02); *H02P 27/08* (2013.01); *H02M 1/12* (2013.01); *H02M 2001/322* (2013.01)

(58) Field of Classification Search
CPC .. H02P 6/002; H02P 23/26; H02P 4/00; H02P 27/08; H02M 5/458; H02M 1/12; H02M 2001/332

USPC .. 318/400.3, 599, 504, 400.17, 400.04, 519, 318/400.31; 363/39, 44, 45, 46, 48, 47, 363/41, 37; 307/105, 109

See application file for complete search history.

(56) References Cited

U.S. PATENT DOCUMENTS

| | | | | |
|---|---|---|---|---|
| 5,343,079 A | * | 8/1994 | Mohan .................... | H02J 9/062 307/105 |
| 5,612,615 A | * | 3/1997 | Gold ....................... | H02M 3/10 323/360 |

(Continued)

FOREIGN PATENT DOCUMENTS

| | | |
|---|---|---|
| JP | 8-182400 A | 7/1996 |
| JP | 2001-352765 A | 12/2001 |

(Continued)

*Primary Examiner* — Rita Leykin
(74) *Attorney, Agent, or Firm* — Hauptman Ham, LLP (57) ABSTRACT

A motor control apparatus includes a PWM rectifier which converts AC power on a three-phase AC input power supply side into DC power or which converts DC power on a DC output side into AC power, a smoothing capacitor which is connected to a DC link on the DC output side of the PWM rectifier, a DC voltage detection unit which detects a DC voltage of the smoothing capacitor, an LCL filter which is connected to the AC input power supply side of the PWM rectifier, a power disconnection unit which is connected to an AC power supply side of the LCL filter, and a control unit which applies, when power is disconnected by the power disconnection unit, electric current to the LCL filter by controlling the PWM rectifier, and lowers the DC voltage to a desired value by discharging energy stored in the smoothing capacitor.

3 Claims, 6 Drawing Sheets

(51) Int. Cl.
*H02P 23/26* (2016.01)
*H02M 1/32* (2007.01)

(56) References Cited

U.S. PATENT DOCUMENTS

| | | | | |
|---|---|---|---|---|
| 5,694,307 | A * | 12/1997 | Murugan | H02M 1/10 363/34 |
| 5,852,558 | A * | 12/1998 | Julian | H02M 1/12 363/132 |
| 6,031,294 | A * | 2/2000 | Geis | F02C 9/56 290/40 R |
| 6,208,537 | B1 * | 3/2001 | Skibinski | H02M 1/12 363/40 |
| 6,265,786 | B1 * | 7/2001 | Bosley | E21B 47/0008 290/46 |
| 6,799,002 | B2 * | 9/2004 | Birumachi | G03G 15/2003 399/330 |
| 6,870,279 | B2 * | 3/2005 | Gilbreth | H02J 1/10 290/52 |
| 6,885,225 | B2 * | 4/2005 | Ohmichi | H02M 7/538 327/108 |
| 6,958,550 | B2 * | 10/2005 | Gilbreth | H02J 1/10 290/2 |
| 7,312,593 | B1 * | 12/2007 | Streicher | G05D 23/1909 318/380 |
| 7,388,353 | B2 * | 6/2008 | Kato | H02M 5/4585 307/31 |
| 7,400,116 | B2 * | 7/2008 | Kato | B60L 11/1803 320/166 |
| 7,564,294 | B2 * | 7/2009 | Ishikawa | H02M 1/08 327/432 |
| 7,565,559 | B2 * | 7/2009 | Chapuis | H02J 1/08 323/234 |
| 8,248,039 | B2 * | 8/2012 | Cao | F03D 7/0272 290/44 |
| 8,362,658 | B2 * | 1/2013 | Ahlborn | H02M 7/72 307/151 |
| 8,779,716 | B2 * | 7/2014 | Fotherby | H02M 7/48 318/106 |
| 9,007,006 | B2 * | 4/2015 | Yun | F04B 49/06 134/21 |
| 9,030,854 | B2 * | 5/2015 | Escobar | H02M 7/42 363/40 |
| 9,102,141 | B2 * | 8/2015 | Yoshino | B41J 2/04541 |
| 9,318,944 | B2 * | 4/2016 | Royak | H02M 7/797 |
| 9,318,992 | B2 * | 4/2016 | Swamy | H02P 27/16 |
| 9,384,885 | B2 * | 7/2016 | Karalis | H01F 38/14 |
| 9,389,263 | B2 * | 7/2016 | Sartler | G01R 31/028 |
| 9,444,287 | B2 * | 9/2016 | Matsuoka | H02J 9/062 |
| 9,488,686 | B2 * | 11/2016 | Bhandarkar | G01R 31/028 |
| 9,490,690 | B2 * | 11/2016 | Bhandarkar | H02M 7/219 |
| 2003/0052544 | A1 * | 3/2003 | Yamamoto | B66B 5/02 307/66 |
| 2004/0041404 | A1 * | 3/2004 | McConnell | F01D 15/10 290/52 |
| 2013/0221895 | A1 * | 8/2013 | Kanda | H02M 1/12 318/767 |
| 2013/0286692 | A1 * | 10/2013 | Patel | H02M 1/32 363/37 |
| 2013/0289911 | A1 * | 10/2013 | Patel | H02M 1/126 702/65 |
| 2013/0329471 | A1 * | 12/2013 | Escobar | H02M 7/487 363/40 |
| 2014/0320056 | A1 * | 10/2014 | Royak | H02M 1/126 318/504 |
| 2015/0054443 | A1 * | 2/2015 | Swamy | H02P 27/16 318/504 |

FOREIGN PATENT DOCUMENTS

| | | |
|---|---|---|
| JP | 2005-287137 A | 10/2005 |
| JP | 2006-340466 A | 12/2006 |
| JP | 2013-199099 A | 10/2013 |
| JP | 5340476 B2 | 11/2013 |

* cited by examiner

MOTOR CONTROL APPARATUS HAVING FUNCTION OF DISCHARGING ENERGY REMAINING IN DC LINK

The present application claims priority to Japanese Application Number 2014-204204, filed Oct. 2, 2014, the disclosure of which is hereby incorporated by reference herein in its entirety.

BACKGROUND OF THE INVENTION

1. Field of the Invention

The present invention relates to a motor control apparatus and, more specifically, to a motor control apparatus having a function of discharging energy stored in a smoothing capacitor provided in a DC link.

2. Description of the Related Art

A motor control apparatus for driving a motor in a machine tool, a forging press, an injection molding machine, an industrial machine, a robot, or the like, uses a rectifier for converting AC power of a three-phase AC input power supply into DC power, and an inverter for converting DC power output from the rectifier into AC power for driving a motor.

Recently, due to demands for reducing power supply harmonics and reactive power, application of a rectifier (PWM rectifier) using pulse-width-modulation (PWM) has been widespread.

Figure 1:
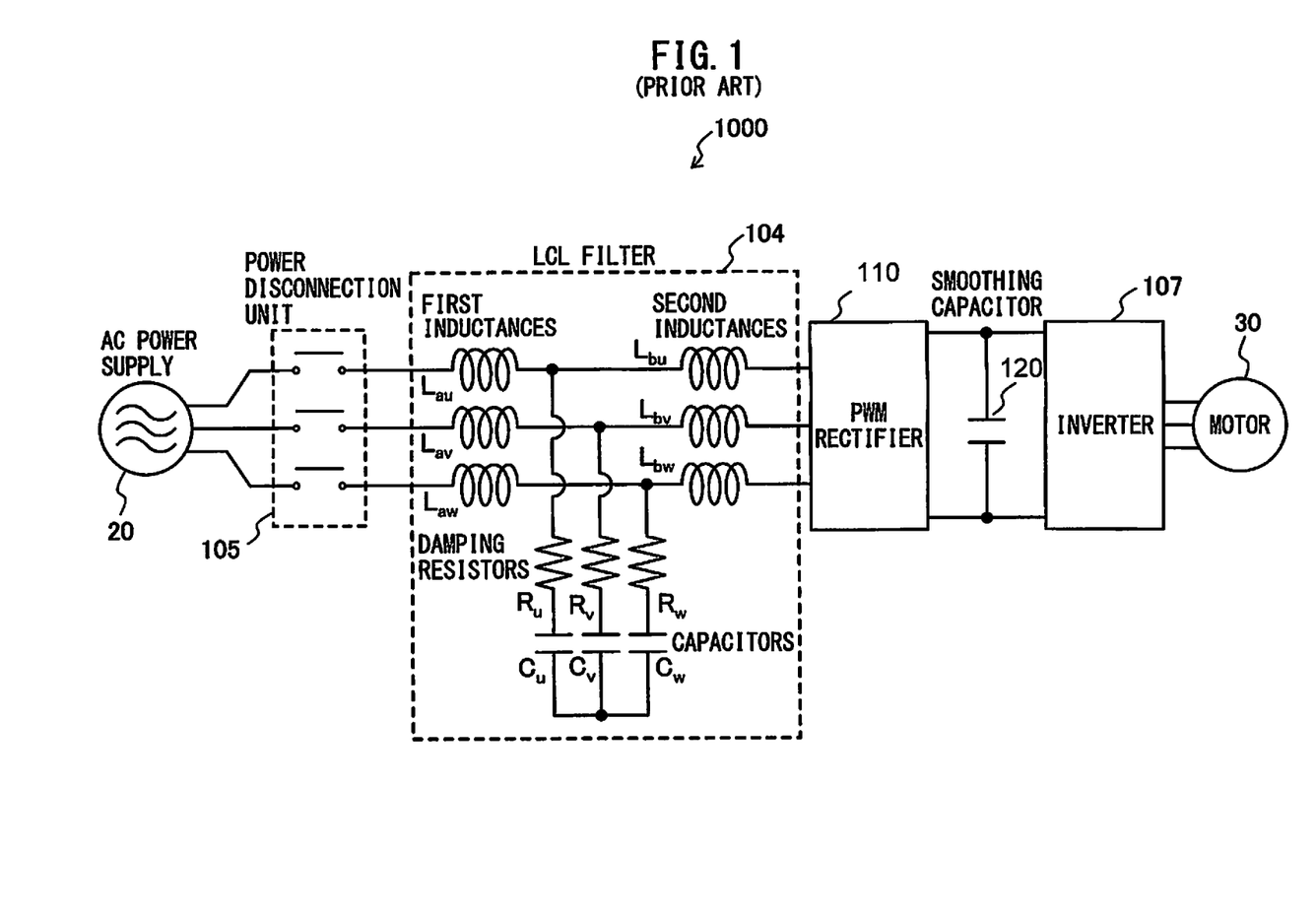
FIG. 1 is a block diagram of a general motor control apparatus.

FIG. 1 illustrates a block diagram of a general motor control apparatus. A motor control apparatus 1000 is such that AC power supplied from an AC power supply 20 serving as a three-phase AC input power supply is converted by a PWM rectifier 110 into DC power which is then converted by an inverter 107 into AC power to drive a motor 30.

A smoothing capacitor 120 for smoothing a DC voltage is provided in a DC link on a DC output side of the PWM rectifier 110.

In addition, on an AC power supply side of the PWM rectifier 110, an LCL filter 104 is connected between the PWM rectifier 110 and the AC power supply 20 in order to prevent high-frequency signals generated by ON/OFF of semiconductor switches from flowing out to the side of the AC power supply 20.

The LCL filter 104 has damping resistors $R_u$, $R_v$, and $R_w$, and capacitors $C_u$, $C_v$, and $C_w$ provided so that each of the damping resistors $R_u$, $R_v$, and $R_w$ is series-connected to an associated one of the capacitors $C_u$, $C_v$, and $C_w$, and also has first inductances $L_{au}$, $L_{av}$, and $L_{aw}$, and second inductances $L_{bu}$, $L_{bv}$, and $L_{bw}$ provided so that each first inductance $L_{au}$, $L_{av}$, or $L_{aw}$, and an associated one of second inductances $L_{bu}$, $L_{bv}$, and $L_{bw}$ are provided at one terminal of an associated one of the resistors $R_u$, $R_v$, and $R_w$.

In addition, a power disconnection unit 105 is provided between the AC power supply 20 and the LCL filter 104. The power disconnection unit 105 performs connection/disconnection between the AC power supply 20 and the LCL filter 104.

In such a motor control apparatus 1000, a PWM rectifier control signal is generated from a power-supply voltage, a power-supply current, and a DC voltage. According to the PWM rectifier control signal, each semiconductor switch of the PWM rectifier 110 is appropriately turned on/off. Thus electric power having a power factor of 1 can be generated. In addition, a DC voltage obtained as an output of the PWM rectifier 110 can be maintained at a desired value. However, in principle, it is necessary to set the DC voltage output from the PWM rectifier 110 to be equal to or higher than a peak value of the AC power supply 20. Thus, the DC voltage is boosted.

Accordingly, even in a case where the motor control apparatus 1000 is stopped, and where the motor control apparatus 1000 and the AC power supply 20 are disconnected from each other by opening the power disconnection unit 105, energy is not discharged from and remains in the smoothing capacitor 120. Thus, the DC link on the DC output side of the PWM rectifier 110 becomes at high voltage. Therefore, when maintenance, such as checking/component-replacement, of the motor control apparatus 1000 is carried out, it is necessary to wait until energy remaining in the smoothing capacitor 120 is discharged by natural electric discharge. Accordingly, work efficiency is poor.

Figure 2:
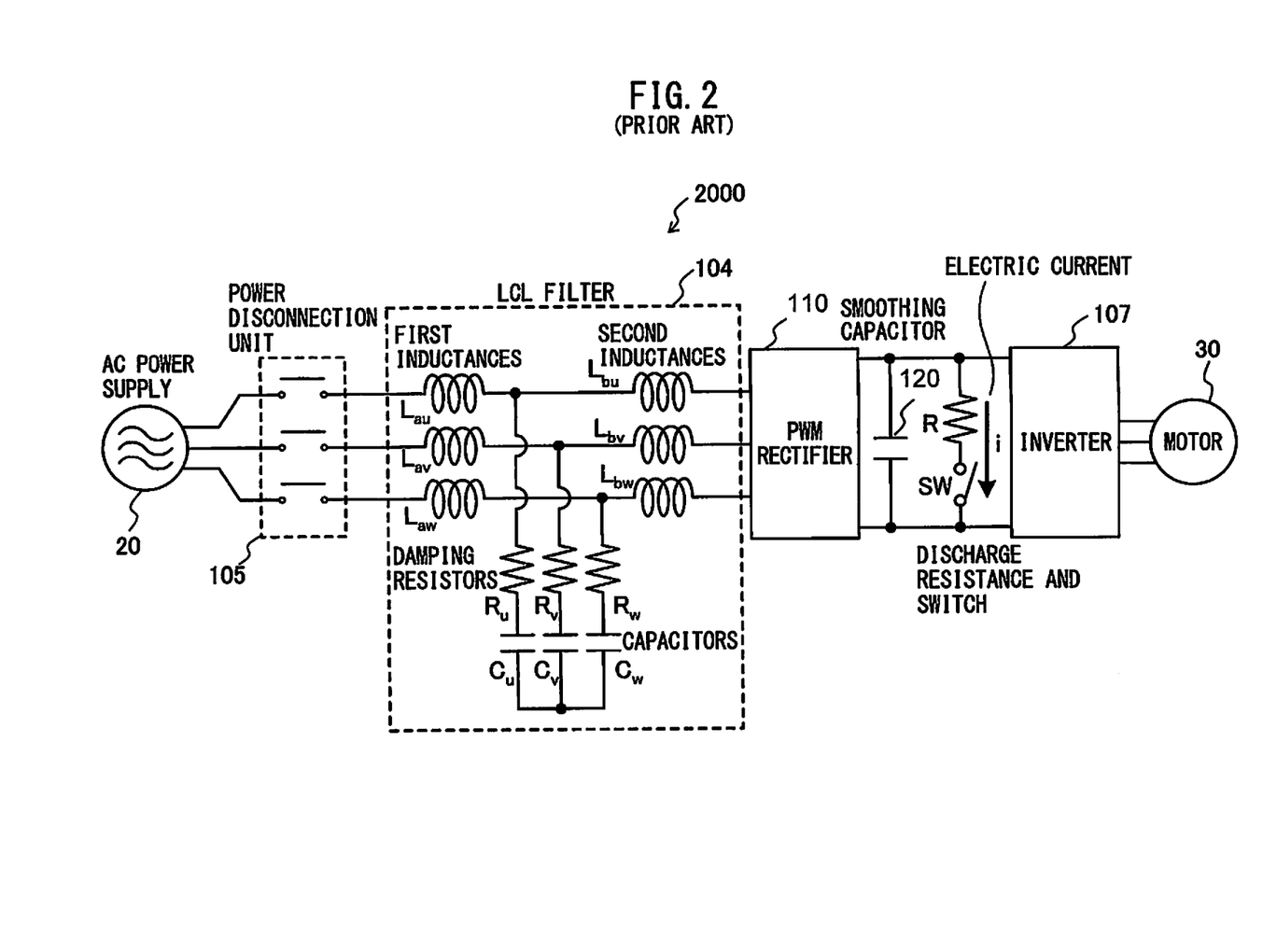
FIG. 2 is a block diagram of a motor control apparatus according to Patent Literature 1.

Thus, a method has been reported (see, e.g., Japanese Patent No. 5340476 (JP-B-5340476) (hereinafter referred to as Patent Literature 1)), which discharges energy remaining in a DC link on a DC output side of a PWM rectifier by providing a discharge resistor and a switch in the DC link. FIG. 2 illustrates a block diagram of a motor control apparatus according to Patent Literature 1. A motor control apparatus 2000 according to Patent Literature 1 has a discharge resistor R and a switch SW provided in a DC link on a DC output side of a PWM rectifier 110. After stopping a normal operation of the motor control apparatus 2000, and disconnecting an AC power supply 20 and the motor control apparatus 2000 from each other by a power disconnection unit 105, the switch SW is turned on. Thus, electric current i flows in the discharge resistor R, and energy stored in a smoothing capacitor 120 is discharged. According to this related art, energy remaining in the smoothing capacitor 120 can be discharged in a short time. Consequently, maintainability is enhanced. However, it is necessary that the discharge resistor and the switch are provided in the motor control apparatus. Thus, the size of the motor control apparatus is large, and the cost thereof is increased.

Figure 3:
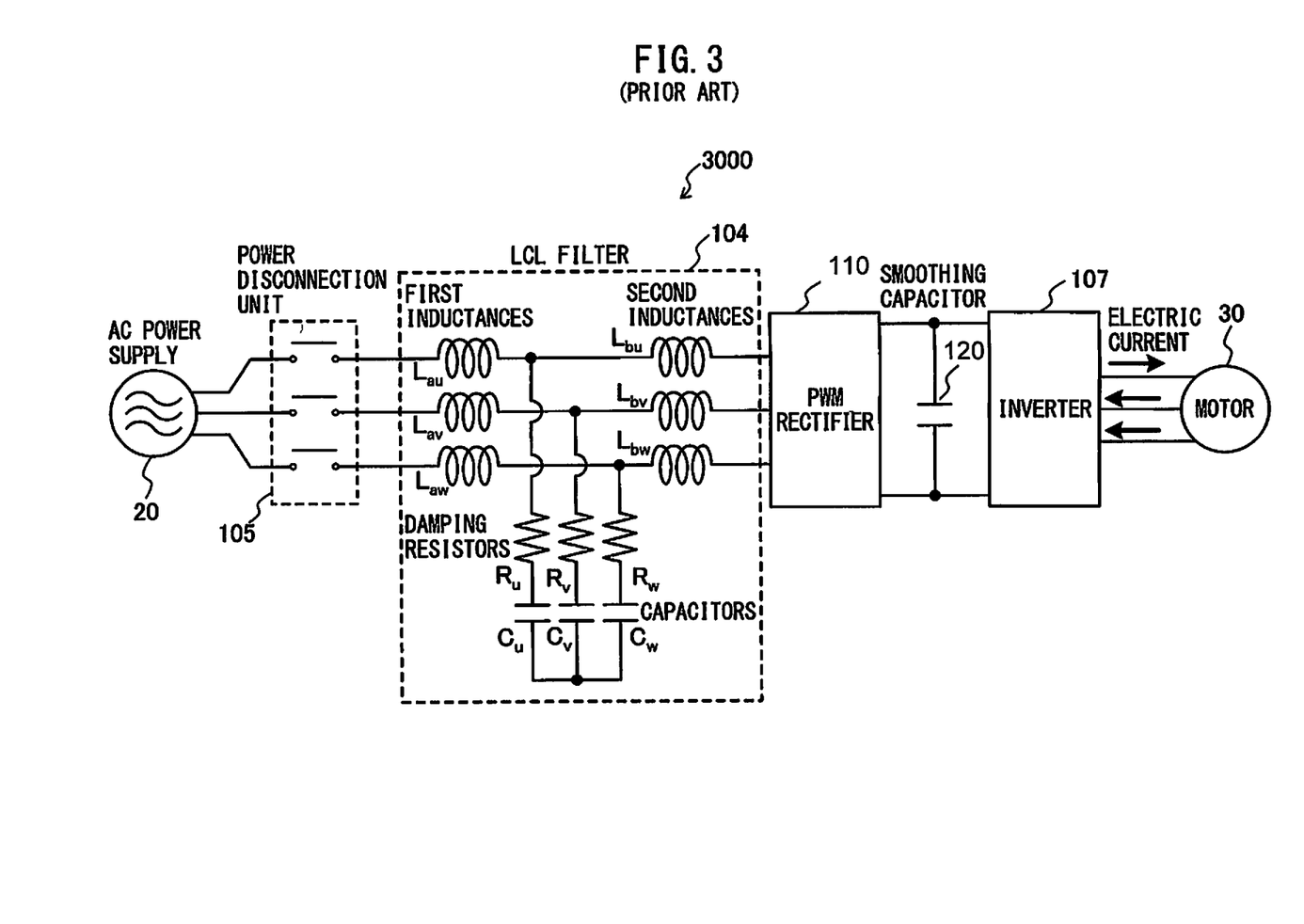
FIG. 3 is a block diagram of a motor control apparatus according to Patent Literature 2.

In addition, another method is known, which discharges energy remaining in a smoothing capacitor by applying electric current to a motor connected to an inverter (see, e.g., Japanese Laid-open Patent Publication No. 8-182400 (JP-A-8-182400) (hereinafter referred to as Patent Literature 2)). FIG. 3 illustrates a block diagram of a motor control apparatus according to Patent Literature 2. A motor control apparatus 3000 according to Patent Literature 2 is such that electric current is applied to a motor 30 by controlling an inverter 107 after stopping a normal operation of the motor control apparatus 3000, and disconnecting an AC power supply 20 and the motor control apparatus 3000 from each other by a power disconnection unit 105, and that energy stored in a smoothing capacitor 120 is discharged by a resistance component of a motor winding. The related art motor control apparatus 3000 can discharge energy remaining in the smoothing capacitor 120 without increasing cost. However, the motor 30 may involuntarily be rotated by applying electric current to the motor 30. Thus, a dangerous state may occur.

SUMMARY OF THE INVENTION

In the related art motor control apparatuses, the method of providing the discharge resistor and the switch in the DC link in order to discharge energy remaining in the smoothing capacitor has the problems that the size of the motor control apparatus is large, and that the cost thereof is increased. In addition, the method of applying electric current to the motor may result in the motor being involuntarily rotated, and therefore a dangerous state may occur.

A motor control apparatus according to one embodiment of the present invention includes a PWM rectifier which converts AC power on a three-phase AC input power supply side into DC power or which converts DC power on a DC output side into AC power, a smoothing capacitor which is provided in a DC link on a DC output side of the PWM rectifier, a DC voltage detection unit which detects a DC voltage of the smoothing capacitor, an LCL filter which is connected to the AC input power supply side of the PWM rectifier, a power disconnection unit which is connected to an AC power supply side of the LCL filter, and a control unit which applies, when power is disconnected by the power disconnection unit, electric current to the LCL filter by controlling the PWM rectifier, and which discharges energy stored in the smoothing capacitor so as to lower the DC voltage to a desired value.

BRIEF DESCRIPTION OF THE DRAWINGS

Objects, characteristics and advantages of the present invention will become more apparent from the following description of embodiments of the present invention with reference to the accompanying drawings, in which.

DETAILED DESCRIPTION

Hereinafter, motor control apparatuses according to the present invention is described with reference to the drawings. However, the technical scope of the present invention is not limited to embodiments of the motor control apparatuses but extends to the invention described in the appended claims and equivalents thereof.

[First Embodiment]

Figure 4:
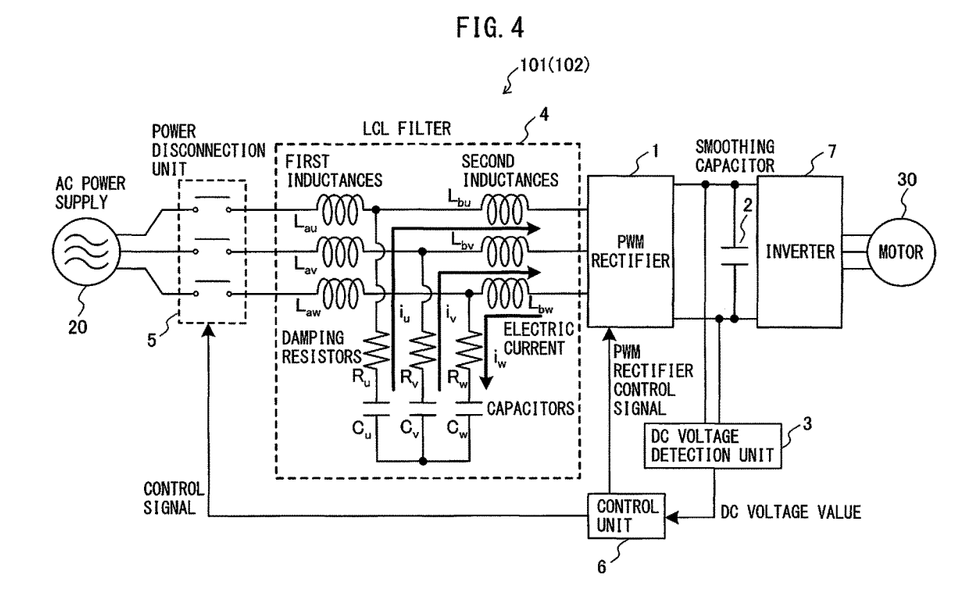
FIG. 4 is a block diagram of a motor control apparatus according to first and second embodiments of the present invention.

A motor control apparatus according to a first embodiment of the present invention is described using the drawings. FIG. 4 is a block diagram of the motor control apparatus according to the first embodiment of the present invention. A motor control apparatus 101 according to the first embodiment of the present invention includes a PWM rectifier 1, a smoothing capacitor 2, a DC voltage detection unit 3, an LCL filter 4, a power disconnection unit 5, and a control unit 6.

The PWM rectifier 1 converts AC power on the side of an AC power supply 20 serving as a three-phase AC input power supply into DC power, or converts DC power on a DC output side into AC power. The PWM rectifier 1 may be configured by, e.g., six switching elements, and diodes respectively parallel-connected thereto. Further, the PWM rectifier 1 is controlled by a PWM rectifier control signal output from the control unit 6.

The smoothing capacitor 2 is provided in a DC link on a DC output side of the PWM rectifier 1 and smooths a voltage of the DC link.

The DC voltage detection unit 3 detects a DC voltage of the smoothing capacitor 2 provided in the DC link. A DC voltage value detected by the DC voltage detection unit 3 is notified to the control unit 6.

The LCL filter 4 is connected to the side of the AC power supply 20 of the PWM rectifier 1. The LCL filter 4 has damping resistors $R_u$, $R_v$, and $R_w$, and capacitors $C_u$, $C_v$, and $C_w$ provided so that each of the damping resistors $R_u$, $R_v$, and $R_w$ is series-connected to an associated one of the capacitors $C_u$, $C_v$, and $C_w$, and also has first inductances $L_{au}$, $L_{av}$, and $L_{aw}$, and second inductances $L_{bu}$, $L_{bv}$, and $L_{bw}$ provided so that each first inductance $L_{au}$, $L_{av}$, or $L_{aw}$, and an associated one of second inductances $L_{bu}$, $L_{bv}$, and $L_{bw}$ are provided at one terminal of an associated one of the resistors $R_u$, $R_v$, and $R_w$.

The power disconnection unit 5 is connected to the side of the AC power supply 20 of the LCL filter 4 and performs connection/disconnection between the AC power supply 20 and the LCL filter 4 according to a control signal output from the control unit 6.

The control unit 6 applies, when power (AC power) is disconnected by the power disconnection unit 5, electric currents $i_u$, $i_v$, and $i_w$ to the LCL filter 4 by controlling the PWM rectifier 1 and converts the power into thermal energy when the electric currents respectively flow in the damping resistors $R_u$, $R_v$, and $R_w$. Consequently, energy stored in the smoothing capacitor 2 is discharged. Thus the DC voltage can be lowered to a desired value. In an example illustrated in FIG. 4, among three-phase currents, a u-phase current $i_u$, and a v-phase current $i_v$ flow into the PWM rectifier 1. A w-phase current $i_w$ flows out of the PWM rectifier 1. However, this is only one example. The present invention is not limited to such an example.

Thus, in the motor control apparatus 101 according to the first embodiment of the present invention, the PWM rectifier 1 is controlled after stopping a normal operation of the motor control apparatus 101, and disconnecting the AC power supply 20 and the motor control apparatus 101 from each other by the power disconnection unit 5. Consequently, the motor control apparatus 101 according to the first embodiment can apply electric current to the LCL filter 4 and discharge energy stored in the smoothing capacitor 2 by the damping resistors of the LCL filter 4. Accordingly, the DC voltage can be lowered to a desired value, e.g., a voltage at which there is substantially no risk of electrical shock, and which maintenance work can be safely carried out.

Figure 5:
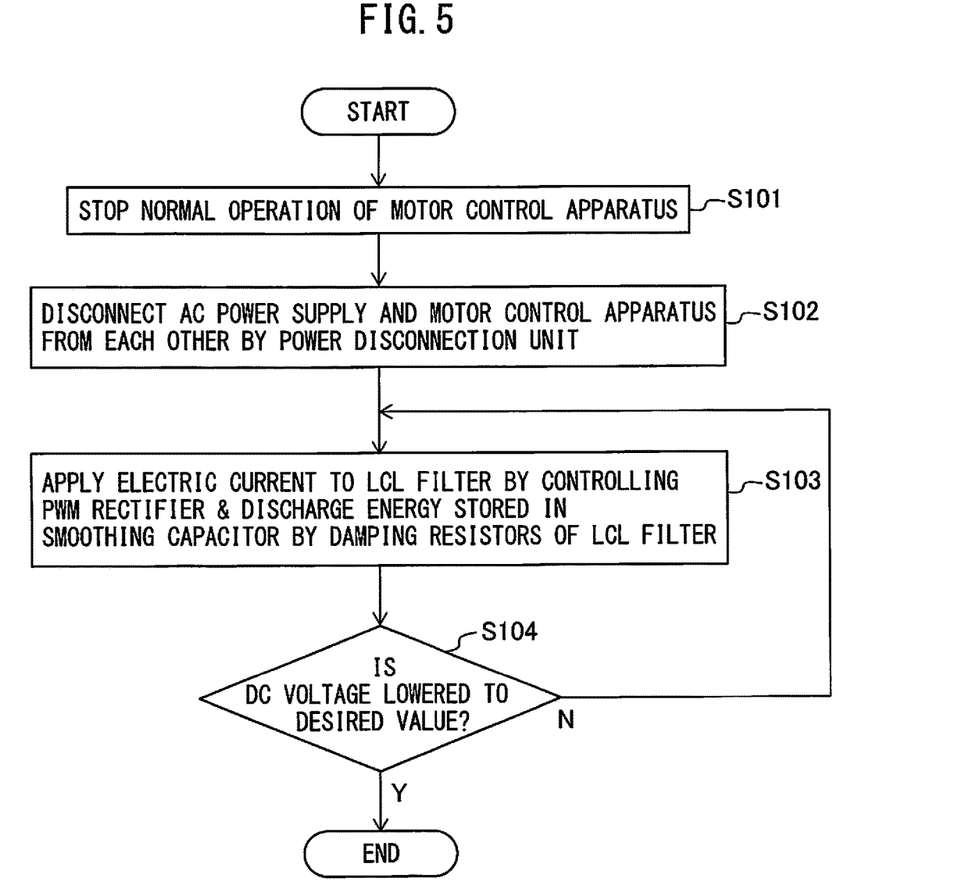
FIG. 5 is a flowchart for illustrating an operation procedure of the motor control apparatus according to the first embodiment of the present invention.

Next, an operation procedure of the motor control apparatus according to the first embodiment of the present invention is described with reference to a flowchart illustrated in FIG. 5. First, in step S101, a normal operation of the motor control apparatus 101 is stopped.

Next, in step S102, the AC power supply 20 and the motor control apparatus 101 are disconnected from each other by the power disconnection unit 5 according to a control signal output from the control unit 6. Next, in step S103, electric current $i_u$, $i_v$, and $i_w$ are applied to the LCL filter 4 by controlling the PWM rectifier 1. Energy stored in the smoothing capacitor 2 is discharged by the damping resistors $R_u$, $R_v$, and $R_w$ of the LCL filter 4. An operation of the PWM rectifier 1 is controlled by a PWM rectifier control signal from the control unit 6.

Next, in step S104, the control unit 6 receives a result of detection of a DC voltage of the DC link from the DC voltage detection unit 3 and determines whether the detected DC voltage is lowered to a desired value. Here, the desired value is a voltage at which maintenance work can be safely carried out. The desired value is, e.g., a voltage at which there is substantially no risk of electrical shock.

If the detected DC voltage is not lowered to the desired value, the procedure returns to step S103 in which the apparatus continues to perform the discharge of the smoothing capacitor 2. On the other hand, if the detected DC voltage is lowered to the desired value, the procedure is terminated.

As described above, according to the motor control apparatus according to the first embodiment, there is no need to provide a discharge resistor and a switch in the motor control apparatus. Thus, maintainability can be enhanced without increasing the size and the cost of the motor control apparatus. In addition, because electric current is not applied to the motor, maintainability can safely be enhanced without causing an involuntary operation of the motor.

(Second Embodiment)

Next, a motor control apparatus according to a second embodiment of the present invention is described hereinafter. A configuration of a motor control apparatus 102 according to the second embodiment is similar to that of the motor control apparatus 101 according to the first embodiment illustrated in FIG. 4. The motor control apparatus 102 includes a PWM rectifier 1, a smoothing capacitor 2, a DC voltage detection unit 3, an LCL filter 4, a power disconnection unit 5, and a control unit 6. The motor control apparatus 102 according to the second embodiment differs from the motor control apparatus 101 according to the first embodiment in that the control unit 6 lowers the DC voltage of the DC link to a peak value of an AC power supply 20 by controlling the PWM rectifier 1 before power is disconnected by the power disconnection unit 5. The motor control apparatus according to the second embodiment is similar in the rest of the configuration to the motor control apparatus according to the first embodiment. Therefore, a detailed description of the rest of the configuration is omitted.

As described in the description of the general motor control apparatus, the DC voltage of the DC link is boosted. Thus, in the motor control apparatus according to the second embodiment of the present invention, the DC voltage is preliminarily lowered to the peak value of the AC power supply 20 before the motor control apparatus 102 is disconnected from the AC power supply 20 by the power disconnection unit 5. Consequently, energy consumed in the LCL filter 4 can be minimized. Thus, heat generated from the damping resistors $R_u$, $R_v$, and $R_w$ can be minimized.

Figure 6:
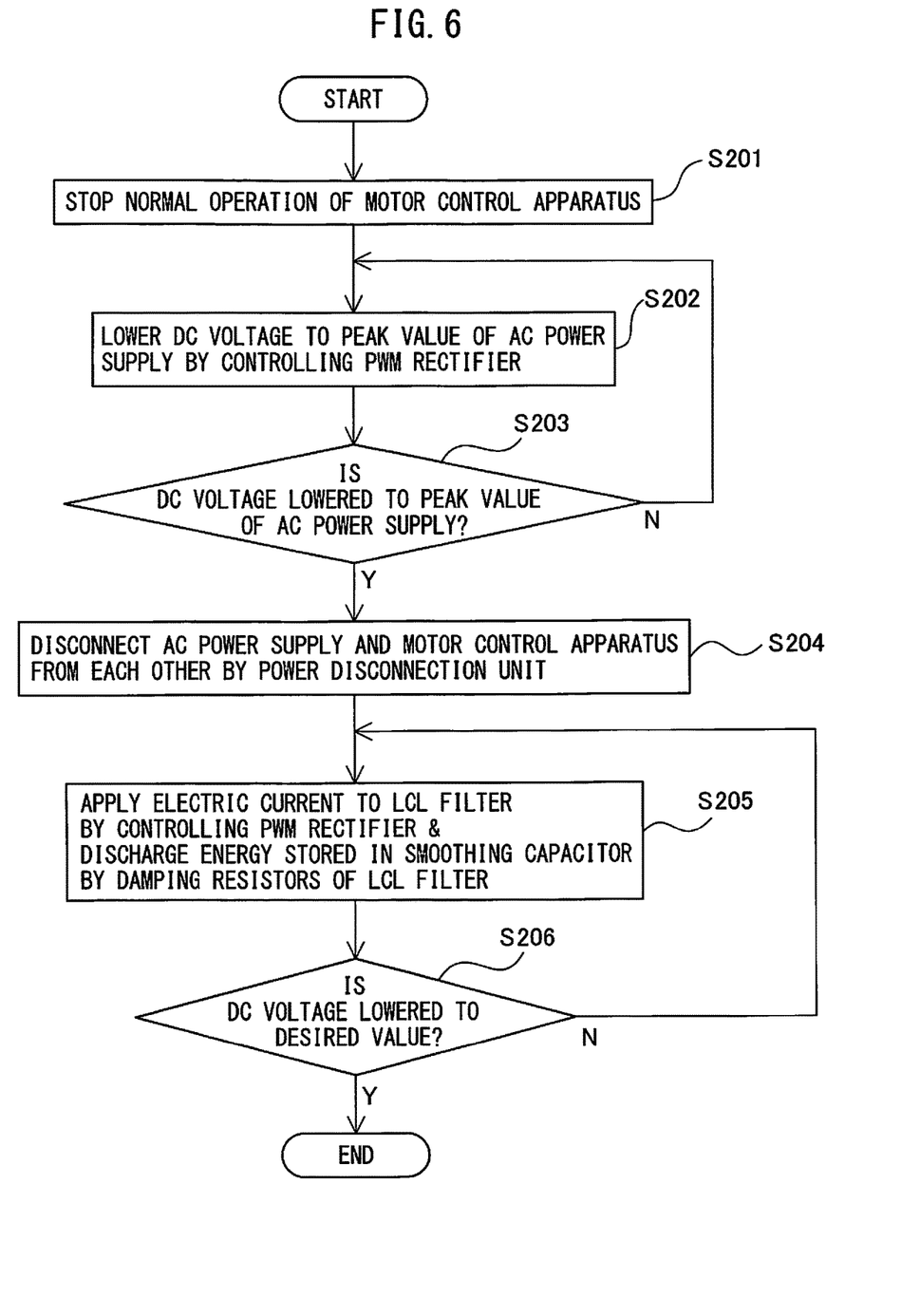
FIG. 6 is a flowchart for illustrating an operation procedure of the motor control apparatus according to the second embodiment of the present invention.

Next, an operation procedure of the motor control apparatus 102 according to the second embodiment is described using a flowchart illustrated in FIG. 6. First, in step S201, a normal operation of the motor control apparatus 102 is stopped.

Next, in step S202, the control unit 6 controls the PWM rectifier 1 while comparing the DC voltage detected by the DC voltage detection unit 3 with the peak value of the AC power supply 20. Next, in step S203, the control unit 6 determines whether the DC voltage is lowered to the peak value of the AC power supply 20. If the detected DC voltage is not lowered to the peak value of the AC power supply 20, the procedure returns to step S202 in which the control unit 6 lowers the DC voltage to the peak value of the AC power supply 20 by controlling the PWM rectifier 1.

Next, in step S204, the AC power supply 20 and the motor control apparatus 102 are disconnected from each other by the power disconnection unit 5, based on a control signal output from the control unit 6. Next, in step S205, electric currents $i_u$, $i_v$, and $i_w$ are applied to the LCL filter 4 by controlling the PWM rectifier 1. Thus, energy stored in the smoothing capacitor 2 is discharged by the damping resistors $R_u$, $R_v$, and $R_w$ of the LCL filter 4. An operation of the PWM rectifier 1 is controlled by a PWM rectifier control signal output from the control unit 6.

Next, in step S206, the control unit 6 receives a result of detection of the DC voltage of the DC link from the DC voltage detection unit 3, and determines whether the detected DC voltage is lowered to a desired value.

If the detected DC voltage is not lowered to the desired value, the procedure returns to step S205 in which the apparatus continues to perform the discharge of the smoothing capacitor 2. On the other hand, if the detected DC voltage is lowered to the desired value, the procedure is terminated.

As described above, in the motor control apparatus according to the second embodiment, the boosted DC voltage of the DC link is preliminarily lowered to the peak value by controlling the PWM rectifier before the motor control apparatus is disconnected from the AC power supply by the power disconnection unit. Consequently, energy consumed in the LCL filter can be minimized. Thus, heat generated by the resistors in the LCL filter can be minimized.

A motor control apparatus according to one embodiment of the present invention, energy remaining in the DC link can safely be discharged without increasing the size and the cost of the motor control apparatus.

The invention claimed is:

1. A motor control apparatus, comprising:
   a PWM rectifier configured to
     convert AC power on a three-phase AC input power supply side into DC power, and
     convert DC power on a DC output side into AC power;
   a smoothing capacitor which is provided in a DC link on the DC output side of the PWM rectifier;
   a DC voltage detection unit configured to detect a DC voltage of the smoothing capacitor;
   an LCL filter which is connected to the AC input power supply side of the PWM rectifier;
   a power disconnection unit which is connected to an AC power supply side of the LCL filter; and
   a control unit configured to apply, after power is disconnected by the power disconnection unit, electric current to the LCL filter by controlling the PWM rectifier, to lower the DC voltage to a desired value by discharging energy stored in the smoothing capacitor,
   wherein the control unit is configured to preliminarily lower the DC voltage to a peak value of a three-phase AC input power supply by controlling the PWM rectifier before power is disconnected by the power disconnection unit.

2. A motor control apparatus, comprising:
   a PWM rectifier configured to
     convert AC power on a three-phase AC input power supply side into DC power, and
     convert DC power on a DC output side into AC power;
   a smoothing capacitor which is provided in a DC link on the DC output side of the PWM rectifier;
   a DC voltage detection unit configured to detect a DC voltage of the smoothing capacitor;
   an LCL filter which is connected to the AC input power supply side of the PWM rectifier;
   a power disconnection unit which is connected to an AC power supply side of the LCL filter; and
   a control unit configured to apply, after power is disconnected by the power disconnection unit, electric current to the LCL filter by controlling the PWM rectifier, to lower the DC voltage to a desired value by discharging energy stored in the smoothing capacitor, wherein, in said discharging the energy stored in the smoothing capacitor after power is disconnected by the power disconnection unit, the control unit is configured to control the PWM rectifier to cause a current to flow in at least one phase from the PWM rectifier into the LCL filter, and another current to flow in another phase from the LCL filter into the PWM rectifier, said another phase different from said at least one phase.

3. A motor control apparatus, comprising:

a PWM rectifier configured to convert AC power on a three-phase AC input power supply side into DC power, or convert DC power on a DC output side into AC power;

a smoothing capacitor which is provided in a DC link on the DC output side of the PWM rectifier;

a DC voltage detection unit configured to detect a DC voltage of the smoothing capacitor;

an LCL filter which is connected to the AC input power supply side of the PWM rectifier;

a power disconnection unit which is connected to an AC power supply side of the LCL filter; and a control unit configured to apply, when power is disconnected by the power disconnection unit, electric current to the LCL filter by controlling the PWM rectifier, and lower the DC voltage to a desired value by discharging energy stored in the smoothing capacitor, wherein the control unit preliminarily lowers the DC voltage to a peak value of a three-phase AC input power supply by controlling the PWM rectifier before power is disconnected by the power disconnection unit.

* * * * *